US007922794B2

(12) United States Patent
Morphey

(10) Patent No.: US 7,922,794 B2
(45) Date of Patent: Apr. 12, 2011

(54) CYCLONIC VACUUM CLEANER RIBBED CYCLONE SHROUD

(75) Inventor: John Morphey, Normal, IL (US)

(73) Assignee: Electrolux Home Care Products, Inc., Cleveland, OH (US)

( * ) Notice: Subject to any disclaimer, the term of this patent is extended or adjusted under 35 U.S.C. 154(b) by 260 days.

(21) Appl. No.: 12/247,766

(22) Filed: Oct. 8, 2008

(65) Prior Publication Data

US 2010/0083833 A1 Apr. 8, 2010

(51) Int. Cl.
*B01D 45/12* (2006.01)

(52) U.S. Cl. ............. 95/271; 55/337; 55/429; 55/459.1; 55/DIG. 3

(58) Field of Classification Search .................... 55/426, 55/429, 337, 459.1, DIG. 3
See application file for complete search history.

(56) References Cited

U.S. PATENT DOCUMENTS

| | | | | |
|---|---|---|---|---|
| 6,195,835 | B1 | 3/2001 | Song et al. | |
| 6,341,404 | B1 | 1/2002 | Salo et al. | |
| 6,521,006 | B2 | 2/2003 | Park et al. | |
| 6,818,032 | B2 | 11/2004 | Bilek et al. | |
| 7,065,826 | B1 | 6/2006 | Arnold | |
| 7,152,277 | B2 | 12/2006 | Jung et al. | |
| 2005/0138763 | A1 | 6/2005 | Tanner et al. | |
| 2008/0257161 | A1 * | 10/2008 | Read | 96/220 |

OTHER PUBLICATIONS

International Search Report mailed Jan. 29, 2010, PCT/US09/59960.

* cited by examiner

*Primary Examiner* — Robert A Hopkins
(74) *Attorney, Agent, or Firm* — Hunton & Williams

(57) ABSTRACT

A vacuum cleaner cyclone separator having a cyclone chamber with an air inlet and an air outlet. The cyclone chamber directs an airflow into a cyclonic pattern to remove a first amount of debris from the airflow. A filter shroud is located within the cyclone chamber and separates the air inlet from the air outlet. The filter shroud includes an air-pervious filter surface adapted to allow the airflow to pass from the air inlet to the air outlet and remove a second amount of debris from the airflow. One or more protrusions are associated with the filter surface, and configured and dimensioned to direct at least a portion of the airflow passing generally parallel to the filter surface away from the filter surface before passing through the filter surface. A dirt collection assembly having a cyclone separator and a method for using a cyclone separator are also disclosed.

22 Claims, 3 Drawing Sheets

CYCLONIC VACUUM CLEANER RIBBED CYCLONE SHROUD

FIELD OF THE INVENTION

The present invention relates to features for use with vacuum cleaners having a centrifugal or cyclonic air separation system. More specifically, the present invention relates to a cyclone shroud having a ribbed or textured surface.

BACKGROUND OF THE INVENTION

Cyclonic vacuum cleaners are well known in the art. Typically, a cyclonic vacuum uses a rigid cyclone container in place of a bag. The cyclone container typically is cylindrical or somewhat tapered, and includes an inlet that receives dirty air, and an outlet through which cleaned or partially-cleaned air exits. A vacuum fan is used to convey the air through the cyclone container, and the fan may be located upstream or downstream of the cyclone container. As the air passes through the cyclone container, it is directed in a cyclonic pattern to remove dirt and dust from the air flow due to the vortex motion of the cyclone. The removed dirt and dust is deposited with the lower portion of the container or directed into an auxiliary dirt collection container as it drops out of the cyclonic air flow.

It is also well known to use more than one cyclone in the air flow path, and multiple series and/or parallel cyclones may be used in a single vacuum cleaner. Further, filtration features, such as shrouds and other kinds of filter, may be used within the air flow path, either within the cyclone or cyclones, or upstream or downstream of them. For example, a shroud may be used to direct the air flow within the cylindrical container into a vortex, and to force the airflow to change directions to remove particles by inertia. Shrouds may come in various shapes and sizes, and it is known to provide cylindrical shrouds, conical shrouds, frustoconical shrouds, and shrouds having other shapes. Shrouds may be formed with a mesh type screen, circular perforations, or other apertures or openings to allow air to pass through the shroud while filtering out larger particles. Depending on the application, the perforations may be specifically sized to prevent certain size dust and dirt particles from passing through, while providing relatively little impediment to the airflow, and different hole geometries have been used in efforts to improve air/dirt separation within a vacuum cleaner.

It is also well known that cyclone shrouds may be provided in the form of microporous filters. Indeed, a shroud is simply a filter having large pores. Filters used in cyclones may comprise any of various useful types and shapes, such as pleated, foam, ultra fine, HEPA, ULPA, and so on. Combinations of shrouds and/or microporous filters having various filtration sizes may be used in any number of combinations within or in conjunction with a vacuum cleaner cyclone separator.

Cyclone shrouds and other kinds of filter also may have other features to enhance airflow or dirt separation. For example, a feature such as a flow reversing lip may be added to a shroud. Flow reversing lips typically are located circumferentially around the bottom lip of the shroud and extend downward, at an angle, or radially, to obstruct the airflow flowing from below the shroud up to the shroud surface. Such flow reversing lips may enhance dirt separation, prevent larger objects from being lifted into contact with the shroud's perforated surface, or provide other benefits. Exemplary cyclonic vacuums having shrouds, reversing lips, filters, and other filtration and flow controlling devices are described in U.S. Pat. Nos. 5,145,499; 5,893,936; 6,910,245; and 7,222,392, which references are incorporated herein.

While various prior art devices, such as those described above, have been used, there exits a need to provide alternatives to such devices.

SUMMARY OF THE INVENTION

In a first exemplary aspect, the present disclosure provides a cyclone separator for a vacuum cleaner. The cyclone separator has a cyclone chamber and a filter shroud. The cyclone chamber has an air inlet and an air outlet, and is adapted to direct an airflow into a cyclonic pattern to remove a first amount of debris from the airflow. The filter shroud is located within the cyclone chamber and separates the air inlet from the air outlet. The filter shroud includes an air-pervious filter surface adapted to allow the airflow to pass from the air inlet to the air outlet and remove a second amount of debris from the airflow. One or more protrusions are associated with the filter surface. The one or more protrusions are configured and dimensioned to direct at least a portion of the airflow passing generally parallel to the filter surface away from the filter surface before passing through the filter surface.

In another exemplary aspect, the present disclosure provides a dirt collection assembly for a vacuum cleaner. The dirt collection assembly has a cyclone chamber, a filter shroud, and a dirt collection chamber. The cyclone chamber has a generally cylindrical sidewall, an air inlet and an air outlet, and is adapted to direct an airflow into a cyclonic pattern to remove a first amount of debris from the airflow. The filter shroud is located within the cyclone chamber and separates the air inlet from the air outlet. The filter shroud includes an air-pervious filter surface adapted to allow the airflow to pass from the air inlet to the air outlet and remove a second portion of debris from the airflow. One or more protrusions are associated with the filter surface, and are configured and dimensioned to direct at least a portion of the airflow passing generally parallel to the filter surface away from the filter surface before passing through the filter surface. The dirt collection chamber is adapted to receive the first amount of debris and the second amount of debris.

In a third exemplary aspect, the present disclosure provides a method for removing debris from an airflow. The method may involve: introducing an airflow through an inlet into a cyclone chamber; causing the airflow to spiral downward through the cyclone chamber (thus forming an outer cyclone column located adjacent an outer wall of the cyclone chamber); causing the airflow to move radially inward towards a center axis of the cyclone chamber; causing the airflow to spiral upward through the cyclone chamber (thus forming an inner cyclone column located radially inward of the outer cyclone column); passing at least a first portion of the airflow forming the inner cyclone column across a filter surface; and passing the first portion of the airflow over a series of obstructions extending from the filter surface before passing the first portion of the airflow through the filter surface.

The recitation of this summary of the invention is not intended to limit the claimed invention. Other aspects, embodiments, modifications to and features of the claimed invention will be apparent to persons of ordinary skill in view of the disclosures herein. Furthermore, this recitation of the summary of the invention, and the other disclosures provided herein, are not intended to diminish the scope of the claims in this or any prior or subsequent related or unrelated application.

BRIEF DESCRIPTION OF THE DRAWINGS

The present invention is described in detail with reference to the examples of embodiments shown in the following figures in which like parts are designated by like reference numerals.

DETAILED DESCRIPTION OF EMBODIMENTS OF THE INVENTIONS

Figure 1:
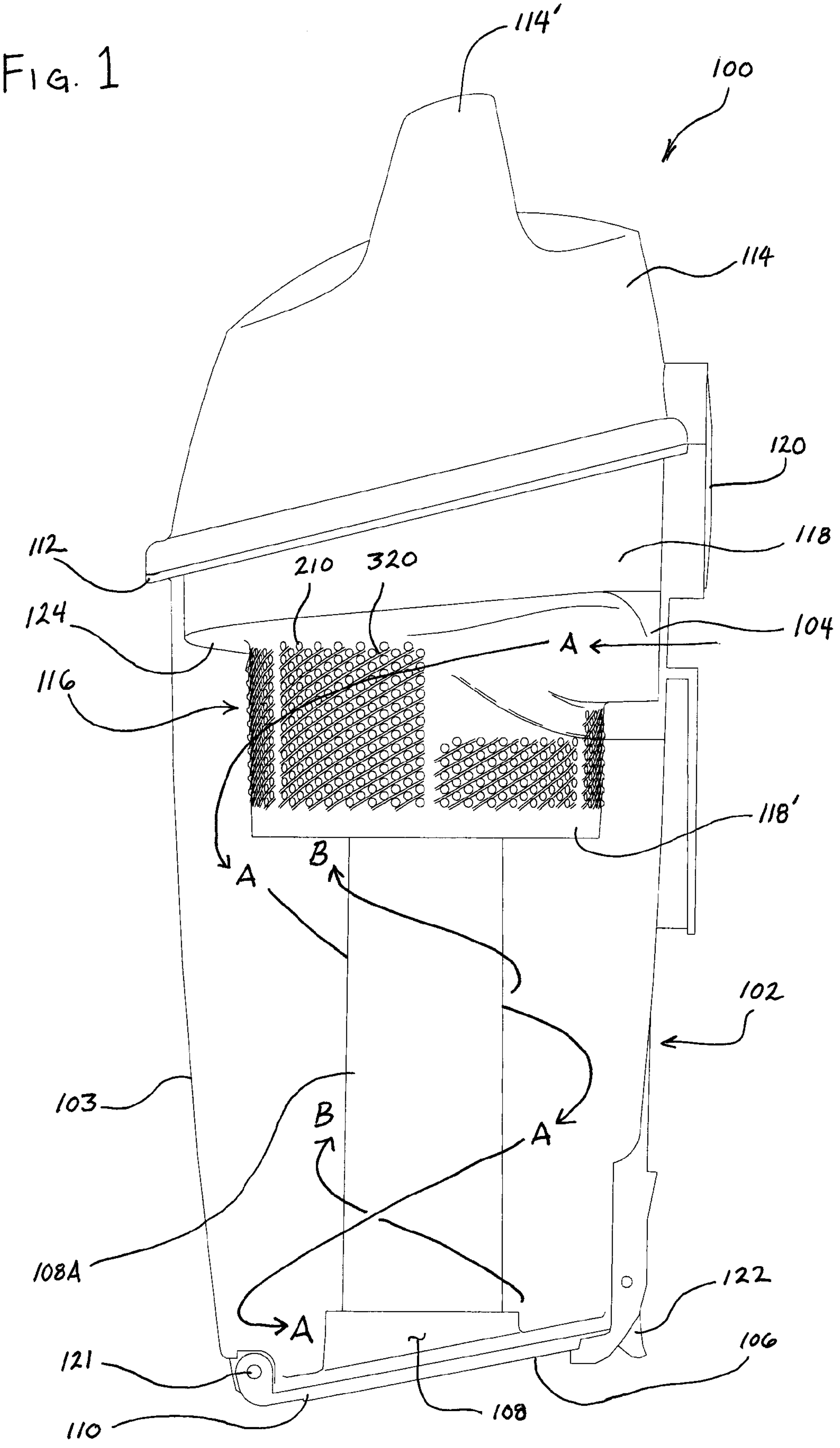
FIG. 1 is a side plan view of a dirt collection assembly incorporating features of the present invention.

The present disclosure provides numerous inventive features relating to a textured shroud for use in a vacuum cleaner separation system. Various features and alternative embodiments of the invention are described with reference to their exemplary use in certain embodiments, but it will be readily appreciated that the features could alternatively be incorporated into other embodiments of vacuum cleaner dirt separation systems. The invention includes these and other variations, as will be appreciated by persons of ordinary skill in the art in view of the present disclosure. Furthermore, the various features described herein may be used separately from one another or in any suitable combination. The present disclosure illustrating various exemplary embodiments is not intended to limit the invention in any way.

An exemplary embodiment of the invention is illustrated in FIGS. 1-4, which generally illustrate a dirt collection assembly 100 for an upright, canister, central or any other type of vacuum cleaner. The dirt collection assembly 100 in the illustrated embodiment is constructed such that it can be attached to and removed from a vacuum cleaner (not shown) as a complete unit, but it will be appreciated that all or portion of the dirt collection assembly may be permanently attached to the vacuum cleaner in other embodiments.

The exemplary dirt collection assembly 100 includes a cup 102 a filter cover 114, and various internal features. The cup 102 is depicted as being generally cylindrical, with a transparent or partially-transparent sidewall 103 having inner and outer surfaces. It will be appreciated that the cup 102 may be made from multiple assembled sidewalls or a single molded structure, and may have any suitable overall exterior and interior shape. The cup 102 has a bottom wall 106 located at or near the bottom of the sidewall 103, to form an enclosed cup-like shape.

The cup 102 has an inlet 104 and an outlet 108. The inlet 104 is adapted to mate with a dirty air passage (not shown) to convey dirty air into the cup 102. The dirty air has dirt and/or debris entrained therein, which is drawn from a surface being cleaned by a conventional vacuum fan (not shown) located upstream or downstream of the inlet 104. The dirty air passage may be connected to a conventional vacuum cleaning device, such as a floor nozzle, cleaning wand nozzle, a vacuum tool such as a brush, or the like. The exemplary inlet 104 passes through the cup sidewall 103 near the upper edge of the cup 102, and may be oriented to direct the airflow in a tangential direction to the inner surface of the cup 102. In other embodiments, the inlet 104 may be located in a lid covering the top of the cup 102, provided through the bottom of the cup 102, or located elsewhere, as will be understood and appreciated by persons of ordinary skill in the art in view of the present disclosure. In addition, the inlet 104 may be provided with (or work in conjunction with) one or more baffles or other structures to direct the air in a tangential or cyclonic manner into the cup 102. Such features are known in the art, and may be desirable, for example, if the inlet 104 directs the incoming dirty air generally perpendicularly into the cup 102, to help initiate a tangential airflow within the cup.

Figure 2:
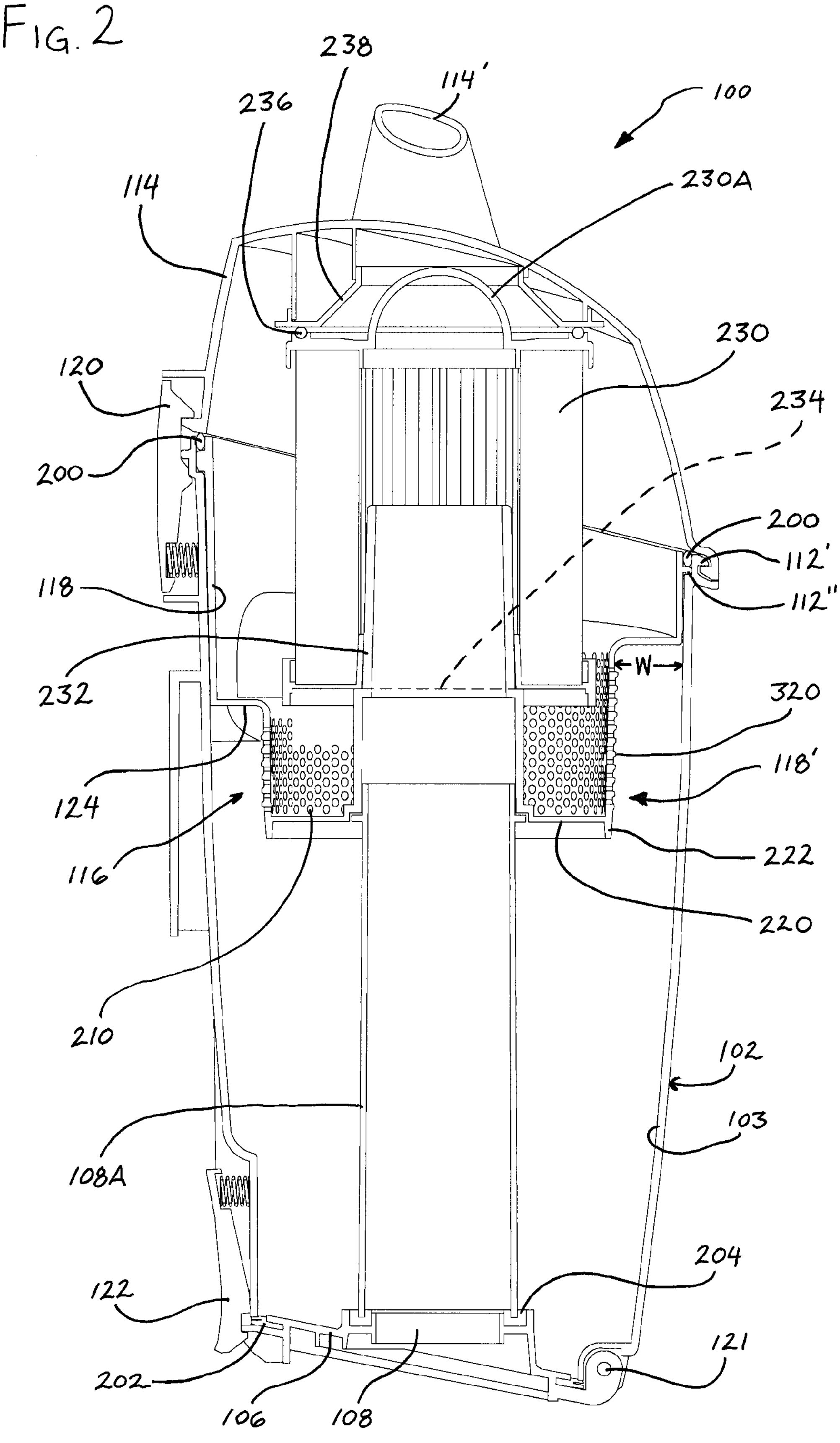
FIG. 2 is a cutaway side view of the exemplary dirt collection assembly of FIG. 1.

The outlet 108 of the exemplary embodiment passes through the bottom wall 106 of the cup 102. As shown in FIGS. 1 and 2, the outlet 108 passes approximately through the center of the bottom wall 106, but it may be offset from the center of the cup 102 by some distance, such as a distance of about 0.125 to about 1.00 inches. In other embodiments, the outlet 108 may pass through the sidewall 103, or through the filter cover 114 (or any other kind of lid over the top of the cup 102). Such variations are known in the art. The outlet 108 provides a path for air to exit the dirt collection assembly 100, and may comprise a simple hole through the cup 102, or it may include an extension, such as outlet tube 108A. The outlet 108 fluidly attaches to the inlet of a vacuum fan or to the atmosphere, depending on whether the vacuum fan is downstream or upstream of the dirt collection assembly 100, respectively. The outlet 108 may have an outlet seal 204 around its circumference to provide an airtight passage to downstream components, and such a seal may be located at the bottom of the outlet tube 108A, if such a tube is used. The outlet seal 204 may be made from a suitable material, such as rubber, silicone, or plastic.

The bottom wall 106 may have a pivoting trap door 110 through which contents of the cup 102 can be released. The exemplary trap door 110 is pivotally mounted at one side of the cup 102 by a hinge 121 and secured in sealing contact with the bottom edge of the sidewall 103 by a lower latch 122 located on the opposite side of the cup 102. A seal 202 may be provided to help prevent dirt and air from passing between the trap door 110 and the sidewall 103. As shown, the outlet 108 may seal against the outlet tube 108A, such as by using an outlet seal 204 when the trap door 110 is closed. Such pivot, catch and seal arrangements are known in the art. In this exemplary embodiment, releasing the trap door 110 with the lower latch 122 provides a way to empty the cup 102 of collected dirt and dust. After opening, the trap door 110 may be closed and secured in place by the lower latch 122. It is understood that this particular construction is not required, and other constructions are possible to provide for emptying of the cup 102. For example, the bottom wall 106 may simply be formed as part of the sidewall 103, and the cup 102 may be emptied by turning it over and removing the filter cover 114 and any other parts sealing the top of the cup 102.

The cup 102 is covered by a lid, an integrally formed upper wall, or any other suitable structure to enclose or selectively cover the top of the dirt collection assembly 100. The enclosing upper structure may be formed as part of the vacuum cleaner to which the cup 102 is attached or as part of the cup 102 itself, or it may be provided as a separate part that is removable from the vacuum cleaner with the cup 102, as in the exemplary embodiment. These and other variations are known in the art. In the shown embodiment, the cup 102 has an upper edge 112 with a lip 112' that provides an attachment point for a filter cover 114. The filter cover 114 is freely attachable and detachable from the cup 102, but it may connected to the cup 102 by a pivot, slide, or other structure that keeps the filter cover 114 and cup 102 from being completely disassembled from one another. As shown in FIG. 2, the filter cover 114 hooks around the lip 112' on one side of the cup 102, and an upper latch 120 secures the filter cover 114 to the upper edge 112 of the cup 102. The upper latch 120 comprises a simple rocker catch, as shown, or some other suitable attachment device (e.g., threaded fastener, cam lock, etc.) that holds the parts together. The filter cover 114 may include a seal (not shown) that forms an airtight seal between the filter cover 114 and the top of the cup 102, but this is not required in all embodiments. The filer cover 114 is shown with an optional handle 114', which may be used to carry the cup 102 when the dirt collection assembly 100 is removed from a vacuum cleaner. The handle 114' also may provide a leverage point for removing the filter cover 114 from the cup 102. It will be understood that this particular construction is optional and other constructions are possible to provide a cover for the cup 102.

A filter shroud 116 is located within the cup 102, and fluidly located between the inlet 104 and the outlet 108. The illustrated filter shroud 116 has an upper wall 118 that mounts to the sidewall 103, and a generally cylindrical filter surface 118' that extends from the upper wall 118 and is located radially inward from the inner surface of the cup sidewall 103. The filter surface 118' may be connected to the upper wall 118 by a generally radial wall 124. The radial wall 124 may have a width W as shown (see FIG. 2), and it may either be generally horizontal, or angled so that the radial wall 124 is not perpendicular to the upper wall 118 and/or the filter surface 118'. In other embodiments, the radial wall 124 (if provided) may be otherwise contoured or configured. For example, the radial wall 124 may have a curved shape or include a curved radius where it joins the filter surface 118' (as shown) and/or the upper wall 118.

As shown in the Figures, the radial wall 124 also may have a ramp-like or helical shape to help direct air and debris downwardly as it rotates within the cup 102. In the exemplary embodiment, this helical shape extends from a point at or above the top of the inlet 104 to a point towards or below the bottom of the inlet 104 as the radial wall 124 circles the cup 102. Modifying the total ramp height (i.e., the distance between the starting point and ending point with respect to the axis of the cyclone chamber) may affect the particle separation properties of the device. For example, terminating the radial wall 124 at a point somewhere at or near the bottom of the flow path of air entering through the inlet 104, such as in the shown embodiment, may cause the air passing around the cup 102 below the radial wall 124 to pass below the incoming air to help prevent the creation of turbulence. Variations on this shape and configuration may be provided in other embodiments.

The filter shroud 116 may be removable from the cup 102, permanently mounted therein, or even integrally formed with the cup 102. In the shown embodiment, the top edge of the upper wall 118 has a lip 118' that mates with a corresponding notch 112" located near the upper edge 112 of the cup 102. A flexible circumferential seal 200 may be provided at the upper edge 112 of the cup 102 to help form an airtight seal between the filter shroud 116 and the sidewall 103. The seal 200 may be made of a suitable sealing material, such as a flexible rubber or plastic. The seal 200, as shown, provides an air tight seal between the filter shroud 116 and the upper edge 112 of the cup 102 when the filter shroud 116 is within the cup 102 (as used herein, the term “air tight” and similar terms contemplates that some marginal amount of air may pass through, particularly where a seal is worn or damaged during use). The seal 200 also (or alternatively) may seal the top of the filter shroud 116 to the bottom of the filter cover 114. An airtight seal between the sidewall 103 and the filter shroud 116 also may be provided by forming the upper wall 118 to closely fit the inner surface of the sidewall 103, by bonding these parts together, or by any other means. It may also be desirable or permissible to provide some amount of air leakage through this location to prevent the vacuum fan motor from overheating if the inlet 104 (or the flow path upstream of the inlet 104) becomes obstructed.

The bottom of the filter shroud 116 is connected to the outlet tube 108A, and an airtight seal may be formed between these parts by ultrasonically bonding them together, forming them integrally, providing a flexible gasket seal, or by simply providing a close tolerance between the parts. As explained above, the outlet tube 108A mates with the outlet 108. As such, the outlet tube 108A may help to position and stabilize the filter shroud 116 within the cup 102.

As best shown in FIG. 2, the filter surface 118' has a series of perforations 210 through which air can pass to travel from the inlet 104 to the outlet 108. The perforations 210 may cover the entire filter surface 118' or only selected portions thereof, and may have any suitable profile (e.g., round, square, etc.), shape (e.g., cylindrical, frustoconical, rounded edges, beveled edges, sharp edges, etc.), orientation (e.g., perpendicular or at an angle relative to the filter surface 118'), size, or arrangement. In the shown embodiment, the perforations 210 are round, have uniform diameters of about 2 millimeters, beveled or rounded edges on the end facing the cup wall 103, and extend through the filter surface 118' in a direction generally perpendicular to the filter surface 118'. The exemplary perforations 210 are arranged in a repeating pattern of helical rows that extend both axially with respect to the cylindrical surface centerline, and around at least a portion of the circumference of the filter surface 118'. In other embodiments, other geometric patterns, such as square patterns (in which the perforations 210 are arranged in a repeating square pattern), or non-geometric patterns may be used instead of the shown pattern of perforations 210. In addition, in other embodiments, the perforations 210 may be randomly distributed or arranged in a unique, non-repeating pattern. It will also be appreciated that the perforations 210 may be provided having a mix of sizes, shapes, patterns, and so on. The perforations 210 allow air to pass from the inlet 104 to the outlet 108 while preventing particles larger than the perforations 210 from passing therethrough. The general concept of perforated shroud structures is known in the art of vacuum cleaners, and any suitable alternative arrangement of perforations or shroud shape may be used.

The filter surface 118' may include one or more portions having no or relatively few perforations 210. In the exemplary embodiment, a solid wall portion 310 lacking perforations is provided adjacent the inlet 104, so that incoming air does not immediately enter perforations 210. The solid wall portion 310 also may help direct the incoming tangential flow of air towards the sidewall 103, which may help encourage cyclonic separation by establishing airflow patterns within the cup 102, and/or help compress incoming debris against the sidewall 103 or direct it away from the filter shroud 118'.

Figure 3:
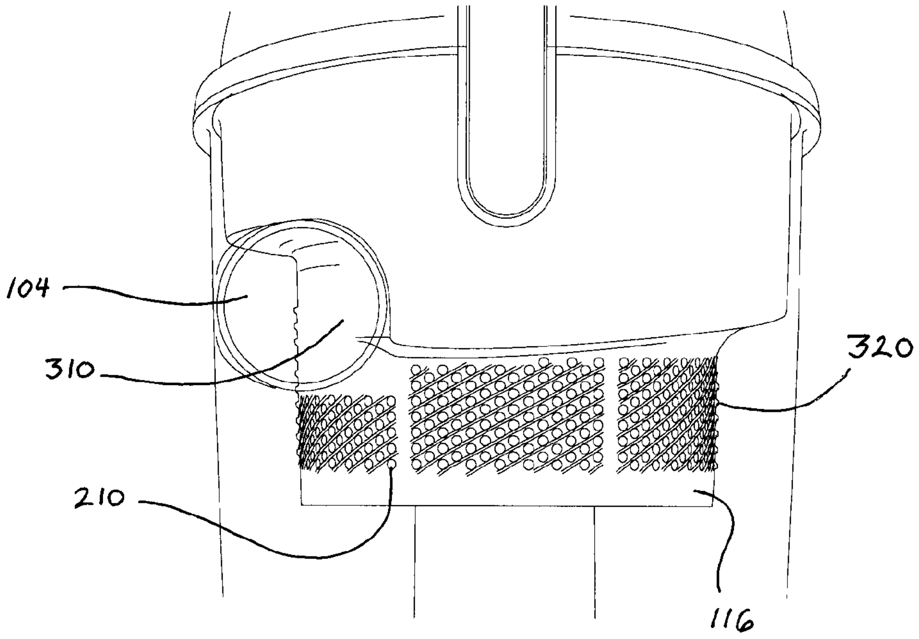
FIG. 3 view of the inlet structure of the exemplary dirt collection assembly of FIG. 1.
Figure 4:
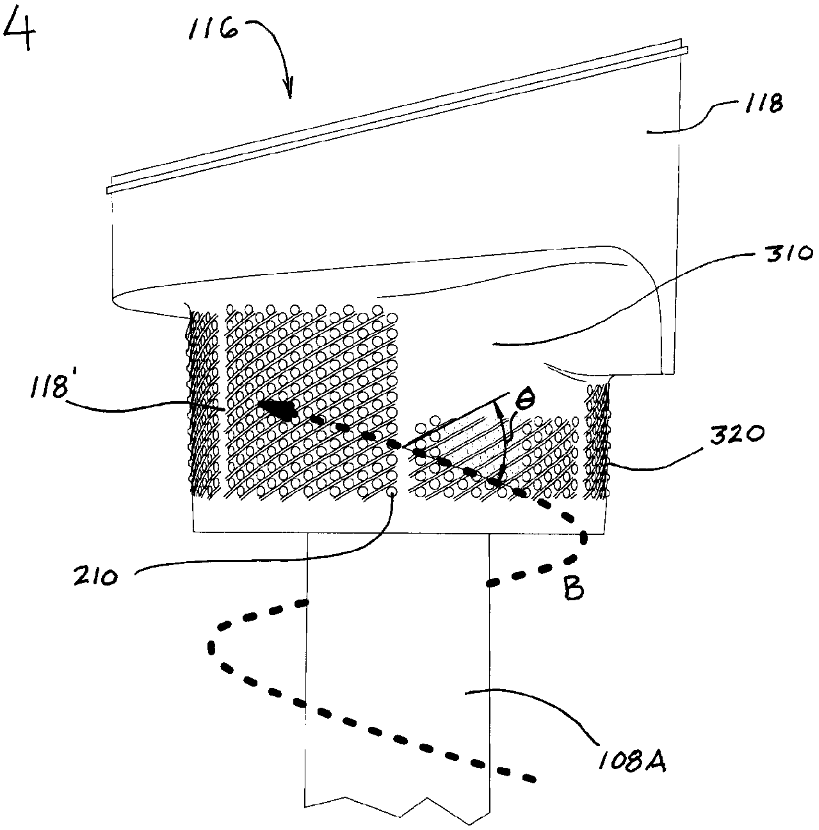
FIG. 4 is a view of a filter shroud of the exemplary dirt collection assembly of FIG. 1.

A series of ribs 320 are located on the filter surface 118'. Each rib 320 comprises a raised structure on the outer surface of the filter surface 118'. The ribs 320 may comprise separate parts, or they may be integrally formed with the filter surface 118'. The ribs may protrude any distance from the filter surface 118', but in the shown embodiment they protrude at least about 0.5 millimeters. In the shown embodiment, some or all of the ribs 320 extend in a helical manner around the circumference of the filter shroud 118', and generally are located between adjacent helical rows of perforations 210. Thus, the helical rows of perforations 210 and the ribs 320 provide a repeating and alternating pattern generally over the entire filter surface 118', as can be seen in FIG. 3, for example.

The ribs 320 are arranged such that they obstruct, rather than conform to the air flowing over the filter surface 118'. As will be appreciated by persons of ordinary skill in the art, air entering the cup 102 generally will rotate tangentially and downward along the outer perimeter of the cup 102, such as shown by arrow "A" in FIG. 1. When the air reaches the bottom wall 106 of the cup (or any debris resting on the bottom wall 106), it tends to reverse its vertical direction, and migrate towards the center of the cup. The air continues to rotate around the cup 102 as it returns upwards and generally along the outlet tube 108A, and eventually arrives at the filter surface 118'. As the air reaches the filter surface 118', it is still rotating in the same direction with which it entered the cup 102, but in an upwards angular direction as shown by Arrow "B," rather than the initial downwards angular direction. In a preferred embodiment, the ribs 320 are oriented to cross the direction of the airflow adjacent the filter surface 118' (see, e.g., FIG. 4), either perpendicularly, or at some substantial crossing angle (e.g., as shown by angle "Θ"). An angle of about 90 to about 30 or 15 degrees, or even less, is expected to provide the benefits of the present invention, but smaller crossing angles may be used and may be ideal under some circumstances.

It has been found that the use of ribs 320 on the filter surface 118' may provide a significant benefit by improving at least some aspects of the dirt collection assembly's performance. Without being limited to any theory of operation, it is believed that the air passes over the filter surface 118', and strikes the ribs 320 (or a boundary layer created by the ribs 320), which provide an obstacle over which air must pass before it can enter the perforations 210. This suspected motion is believed to lift objects away from the filter surface 118'. Furthermore, the ribs 320 hold large particles away from the perforations 210, to thereby allow air to flow into the perforations 210 along the channel between adjacent ribs 320, even when a large object, such as a piece of paper, might by pressed against the ribs 320. In addition to improving cyclone performance (particularly when the cup 102 is nearly full of debris), it has been found that the ribs 320 may also help prevent elongated particles such as hair and fibers from clinging to the filter surface 118'. This may improve cyclone operating performance and make it easier to clean and maintain the filter surface 118'.

As shown in FIG. 2, the filter surface 118' may be radially displaced relative to the outlet tube 108A, and joined to it by a lower wall 220, but in alternative embodiments, the outlet tube 108A may be omitted, or may have the same or a larger diameter than the filter surface 118'. In the shown embodiment, the lower wall 220 may include a downwardly-projecting annular lip 222 around its bottom circumference, or other structures to help control the airflow, improve efficiency or provide other benefits. As shown, the exemplary lip 222 may extend in a generally downward direction perpendicular to the longitudinal axis of the filter shroud 116. This lip 222 may force the air flow to change direction, thus serving as a flow reversing lip, or otherwise alter the airflow pattern within the device as it progresses from the lower portions of the cup 102 to the filter surface 118'. For example, the air, once it reaches the surface of the lower wall 220, may flow radially outward to the lip 222, which may cause it to change directions with the result being that additional debris is removed from the airflow by inertia. Alternatively, the lip 222 may create a recirculating or dead air space below the lower wall 220 that slows the air and helps remove entrained particles. Regardless of the manner or theory of operation, lips 222, such as in the exemplary embodiment or having other shapes (for example, as a radially extending wall or a frustoconical projection) may be used with embodiments of the present invention, if desired. It will also be understood that the lower wall 220 may itself include perforations.

It will be understood that the filter shroud 116 and filter surface 118' depicted in the exemplary embodiment are only one possible embodiment of the invention, and variations on the illustrated shape and construction will be readily apparent to persons of ordinary skill in view of the present disclosure. For example, the filter shroud 116 may be formed from a single molded piece of plastic, and it may have different shapes. Furthermore, the filter surface 118' may have other shapes, such as a frustoconical shape, a rounded shape, or a mix of different shapes. In addition, the filter surface 118' may comprise a screen or other filter medium (such as a conventional pleated filter, a rigid nonwoven fiber mat, a porous plastic material, or any other material suitable for filtering particles from air), and the ribs 320 may comprise a separate part that is fitted or formed over the screen or filter. In addition, the ribs 320 may be provided as an add-on part that can be attached to a pre-existing shroud or filter.

Furthermore, the illustrated filter shroud 116 may be replaced or modified, and the filter surface 118' may be held in the dirt collection assembly 100 in other ways. For example, in other embodiments, the upper wall 118 and/or radial wall 124 may be modified, minimized or reshaped to provide other structures that hold the filter surface 118' in position within the dirt collection assembly 100. For example, the upper wall 118 may be omitted, and the radial wall 124 may provide the only support between the filter surface 118' and the sidewall 103, such as shown in U.S. Pat. No. 6,910,245. In another embodiment, the upper wall 118 and radial wall may be omitted, and the filter surface 118' may be mounted to the filter cover 114 or other lid structure, such as shown in U.S. Pat. No. 6,558,453. In still other embodiments, the filter surface 118' may be provided as a separate part that is mounted over an outlet tube and captured in place by a lid, such as shown in U.S. Pat. No. 6,829,804, or such a filter surface 118' may be attached to the outlet tube such that it is not necessary to capture it in place by a lid. In still other embodiments, the filter surface 118' may be mounted in a cyclone chamber above a removable dirt cup, in which case the combined structure formed by the cyclone chamber and the dirt cup forms the dirt collection assembly. An example of a device having the foregoing general structure is illustrated in U.S. Patent Publication No. 2005/0138763. The disclosures of the foregoing references are all incorporated herein.

A filter 230 may be located within the filter shroud 116, as illustrated in FIG. 2. The filter 230 is fluidly located in the air path between the filter shroud 116 and the outlet 108 so that air must pass through the filter 230 before reaching the outlet 108. The filter 230 is arranged such that air passes radially inward through the cylindrical filter wall, but other filter shapes and airflow patterns may be used. The filter 230 may mounted in the dirt collection assembly 100 in any suitable way. For example, as shown, the filter 230 may be mounted upon a filter stem 232, which is connected to the top of the outlet tube 108A or formed integrally therewith. The filter 230 has a circular bottom opening 234 that fits over the filter stem 232, or alternatively, the filter 230 may have a lower extension that fits within the filter stem 232 or outlet tube 108A or outlet 108. When installed, the filter 230 seals against the filter stem 232 such that air passing to the outlet 108 must pass through the filter 230. While this construction is preferred, it will be appreciated that other constructions are possible. For example, in other embodiments, a filter stem may not be provided.

The filter 230 preferably is securely retained on the filter stem 232. For example, the filter 230 may be fitted to the filter stem 232 by a friction fit, a bayonet fitting, a fastener, or by other attachment means. In the shown embodiment, the filter 230 is held in place on the filter stem 232 by a filter seal 236 and upper filter retainer 238 (which may be provided as part of the filter cover 114), that press and/or capture the filter 230 in place. The filter seal 236 and the upper filter retainer 238 press the filter 230 in place, and may provide an airtight seal over the top of the filter. To this end, the filter seal 236 may be made of an appropriate material, such as rubber, silicone, or plastic, that seals against and presses down on the filter 230. The upper filter retainer 238 may be formed as part of the inner surface of the filter cover 114, or provided as a separate part that is attached to the filter cover 114 or otherwise mounted in place. If desired, the filter 230 may be attached to the filter cover 114 to be removed therewith, or it may remain in place on the filter stem 232 when the filter cover 114 is removed, as in the shown embodiment.

The filter 230 may be made of any suitable material, such as a pleated paper filter, a flexible foam filter, a porous plastic filter, and so on, or a combination of materials. The filter material can be such as to remove fine particulate matter from the air flow as it passes through the filter 230, and preferably is selected to complement the filtration performance of the filter surface 118' (e.g., selected to remove smaller particles that are more likely to pass through the filter shroud 118'). The filter 230 may be a HEPA ("High Efficiency Particulate Air") type filter or any other suitable grade of filter. Different types of filters may be interchangeably used based upon different air quality needs. A handle 230A may be mounted on the filter 230 to facilitate its installation and removal, as known in the art.

The air flow path of an exemplary embodiment of the dirt collection assembly will now be described. Dirty air containing dirt and dust particles of varying sizes and types is conveyed by a conventional vacuum fan and duct system to the dirt collection assembly inlet 104 to the dirt collection assembly 100. The dirty air passes through the inlet 104, enters the cup 102, and is tangentially directed around the inner wall of the cup 102. This tangential flow causes the air to follow the inner surface of the cup 102. The inlet 104 is located below the radial wall 124 of the filter shroud 116, and the radial wall 124 helps direct the airflow downward along the inner surface of the cup 102. As the air flows downward along the cup 102, a cyclonic vortex forms. The generally round, frustoconical, or cylindrical shape of the cup 102 may aid in the formation of the cyclone. The air flows downward until it reaches the bottom wall 106. Upon reaching the bottom wall 106, the air flows radially inward, and then upward along the outer surface of the outlet tube 108A. At this point, two cyclonic flows may simultaneously exist in the cup 102. One is a downward cyclonic flow along the inner surface of the cup 102, forming a first cyclonic column. The second is an upward cyclonic flow along the outer surface of the outlet tube 108A, forming a second cyclonic column moving vertically opposite to the first cyclonic column. The cyclonic flow, coupled with the change in direction, may force dirt and dust particles to exit the air flow. Upon exiting the air flow, the dirt and dust particles may be begin to settle upon the bottom wall 106 of the cup 106.

Returning to the upward cyclonic flow along the outer surface of the outlet tube 108A, the air will flow upward until it contacts the lower wall 220 of the filter shroud 116. Once it reaches the lower wall 220, the air will flow radially outward. As noted above, the flow reversing lip 222 may help remove additional particles or prevent particles from rising upward with the inner cyclone flow. Upon reaching the outer edge of the flow reversing lip 222, the air flows upward over the filter surface 118', preferably still retaining a cyclonic movement as it does so. Upon reaching the filter surface 118', the air will begin passing through the perforations 210 and into the interior of the filter shroud 116. The air flow through the perforations 210 may be generally perpendicular to the longitudinal axis of the filter shroud 116. Before passing through the perforations 210, the airflow encounters the ribs 320, which may help improve the cyclone performance in one or more respects, as explained above. Particles that travel to the filter surface 118' and can not pass through the perforations 210 eventually fall out of the airflow (either during operation or when the airflow is stopped), and are collected in the cup 102. Some particles may cling to the filter surface 118', but it has been found that the ribs 320 reduce the likelihood of such occurrences.

Upon reaching the interior of the filter shroud 116, the air rises and encounters the filter 230. The filter seal 236 and the upper filter stem 234 prevent the air from flowing over the top or under the bottom of the filter 230, leaving the only air path through the filter medium. The filter 230 removes additional dirt and dust particles from the air. Once the air passes through the filter 230 it travels downward through the upper filter stem 234, outlet tube 108A, and eventually the outlet 108. The vacuum fan may be downstream of the outlet 108 or upstream of the inlet 104, or even contained within the dirt collection assembly 102, such as by being mounted within the filter shroud 116 or outlet tube 108A. After exiting the outlet 108, the air eventually exits the vacuum cleaner and is exhausted to the atmosphere. One or more additional filters may, of course, be positioned at or after the outlet 108 to further filter the air as it exits.

The present disclosure describes a number of new, useful and nonobvious features and/or combinations of features that may be used alone or together with cyclonic vacuum cleaners and possibly other kinds of suction cleaning devices. The embodiments described herein are all exemplary, and are not intended to limit the scope of the inventions in any way. It will be appreciated that the inventions described herein can be modified and adapted in various ways and for different uses, and all such modifications and adaptations are included in the scope of this disclosure and the appended claims.

What is claimed is:

1. A cyclone separator for a vacuum cleaner, the cyclone separator comprising:

a cyclone chamber having an air inlet and an air outlet, the cyclone chamber being adapted to direct an airflow into a cyclonic pattern to remove a first amount of debris from the airflow;

a filter shroud located within the cyclone chamber and separating the air inlet from the air outlet, the filter shroud comprising an air-pervious filter surface adapted to allow the airflow to pass from the air inlet to the air outlet and remove a second amount of debris from the airflow; and one or more protrusions associated with the filter surface, the one or more protrusions being configured and dimensioned to direct at least a portion of the airflow passing generally parallel to the filter surface away from the filter surface before passing through the filter surface;

wherein the filter surface is generally cylindrical or frustoconical, and the one or more protrusions comprise a plurality of ribs extending in a generally helical pattern around the filter surface, the ribs being oriented generally perpendicular to the portion of the airflow passing generally parallel to the filter surface.

2. The cyclone separator of claim 1, wherein the filter surface comprises a perforated surface having a plurality of discrete holes therethrough.

3. The cyclone separator of claim 1, wherein the plurality of ribs are arranged at an angle of about 15 degrees to about 60 degrees with respect to a plane orthogonal to a central axis of the filter surface.

4. The cyclone separator of claim 1, wherein the one or more protrusions extend at least about 0.5 millimeters from the filter surface.

5. The cyclone separator of claim 1, wherein the filter surface comprises a perforated surface having a plurality of discrete holes therethrough, and the plurality of discrete holes are arranged in a series of helical rows located adjacent the plurality of ribs.

6. The cyclone separator of claim 5, wherein the perforations have a diameter of about 2 millimeters.

7. The cyclone separator of claim 1, wherein the one or more protrusions are formed integrally with the filter surface.

8. The cyclone separator of claim 1, wherein the one or more protrusions comprises a plurality of parallel ribs that are attachable over the outer surface of the filter surface, and the filter surface comprises a pleated filter.

9. A dirt collection assembly for a vacuum cleaner, the dirt collection assembly comprising:

a cyclone chamber having a generally cylindrical sidewall, an air inlet and an air outlet, the cyclone chamber being adapted to direct an airflow into a cyclonic pattern to remove a first amount of debris from the airflow;

a filter shroud located within the cyclone chamber and separating the air inlet from the air outlet, the filter shroud comprising an air-pervious filter surface adapted to allow the airflow to pass from the air inlet to the air outlet and remove a second portion of debris from the airflow;

one or more protrusions associated with the filter surface, the one or more protrusions being configured and dimensioned to direct at least a portion of the airflow passing generally parallel to the filter surface away from the filter surface before passing through the filter surface; and a dirt collection chamber adapted to receive the first amount of debris and the second amount of debris;

wherein the filter surface is generally cylindrical or frustoconical, and the one or more protrusions comprise a plurality of ribs extending in a generally helical pattern around the filter surface, the ribs being oriented generally perpendicular to the portion of the airflow passing generally parallel to the filter surface.

10. The dirt collection assembly of claim 9, wherein the plurality of ribs are arranged at an angle of about 15 degrees to about 60 degrees with respect to a plane orthogonal to a central axis of the filter surface.

11. The dirt collection assembly of claim 9, wherein the filter surface comprises a perforated surface having a plurality of discrete holes therethrough, and the plurality of discrete holes are arranged in a series of helical rows located adjacent the plurality of ribs.

12. The dirt collection assembly of claim 9, wherein the filter surface is generally cylindrical or frustoconical, and the dirt collection assembly further comprises a filter located downstream of the filter surface, the filter being adapted to remove a third amount of debris from the airflow.

13. The dirt collection assembly of claim 12, the one or more protrusions comprise a plurality of ribs extending in a generally helical pattern around the filter surface, the ribs being oriented generally perpendicular to the portion of the airflow passing generally parallel to the filter surface.

14. The dirt collection assembly of claim 12, wherein the filter shroud comprises an upper wall extending generally radially from an end of the filter surface to a location adjacent the cyclone chamber sidewall to seal an upper end of the cyclone chamber and the filter is located at least partially within a volume defined by filter surface.

15. The dirt collection assembly of claim 14, wherein the filter is enclosed between the filter shroud and a lid, the lid being adapted to press the filter against the filter shroud.

16. The dirt collection assembly of claim 9, wherein the inlet passes through the cyclone sidewall.

17. The dirt collection assembly of claim 9, wherein the dirt collection chamber comprises a portion of the cyclone chamber located below an end of the filter shroud.

18. The dirt collection assembly of claim 17, wherein the dirt collection chamber comprises a bottom wall, and the outlet passes through the bottom wall.

19. A method for removing debris from an airflow, the method comprising:

introducing an airflow through an inlet into a cyclone chamber;

causing the airflow to spiral downward through the cyclone chamber, thus forming an outer cyclone column located adjacent an outer wall of the cyclone chamber;

causing the airflow to move radially inward towards a center axis of the cyclone chamber;

causing the airflow to spiral upward through the cyclone chamber, thus forming an inner cyclone column located radially inward of the outer cyclone column;

passing at least a first portion of the airflow forming the inner cyclone column across a filter surface; and passing the first portion of the airflow over a series of obstructions extending from the filter surface before passing the first portion of the airflow through the filter surface;

wherein the first portion of the airflow is traveling in a first helical direction with respect to the center axis, and the series of obstructions comprises a plurality of ribs extending in a second helical direction with respect to the center axis, and the first helical direction and the second helical direction have a crossing angle of at least about 15 degrees.

20. The method of claim 19, wherein the series of obstructions are arranged generally perpendicular to a direction in which the first portion of the airflow is moving.

21. The method of claim 19, wherein the crossing angle is at least about 60 degrees.

22. The method of claim 19, wherein the first helical direction and the second helical direction are generally perpendicular.

* * * * *